UNITED STATES PATENT OFFICE.

HEINRICH JORDAN AND WILHELM NEELMEIER, OF LEVERKUSEN, NEAR COLOGNE, GERMANY, ASSIGNORS TO FARBENFABRIKEN VORM. FRIEDR. BAYER & CO., OF ELBERFELD, GERMANY, A CORPORATION OF GERMANY.

BLUE COTTON-DYE.

1,032,412.   Specification of Letters Patent.   Patented July 16, 1912.

No Drawing.   Application filed September 1, 1911. Serial No. 647,252.

*To all whom it may concern:*

Be it known that we, HEINRICH JORDAN and WILHELM NEELMEIER, doctors of philosophy, chemists, citizens of the German Empire, residing at Leverkusen, near Cologne, Germany, have invented new and useful Improvements in Blue Cotton-Dye, of which the following is a specification.

The present invention relates to the manufacture of new azo dyestuffs capable of dyeing cotton in from reddish-blue to greenish-blue shades which by an after treatment with diazotized para-nitranilin or other suitable diazo compounds are rendered fast to washing. The shades thus obtained can be easily discharged with hydrosulfite to a pure white. The new dyes having most probably the formula:

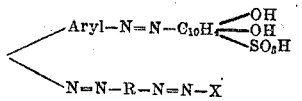

in which R means an aromatic nucleus, and X the radical of an oxy-naphthalene sulfonic acid, are after being dried and pulverized in the shape of their alkaline salts dark powders soluble in water. They yield upon reduction with stannous chlorid and hydrochloric acid 2-amino-1.8-dioxynaphthalene-4-sulfonic acid, a para-phenylenediamin compound a diamin and an aminonaphthol sulfonic acid.

The process for producing the new dyes consists in combining diazotized acidyl-para-phenylenediamins or para-nitranilin their homologues or substitution products with a suitable middle component capable of being diazotized after combination, rediazotizing the monoazo dye obtained, combining it with a naphthol sulfonic acid, eliminating the acidyl radical from the acidyl compounds or reducing the nitro group, diazotizing the amino compounds thus produced and combining them with 1.8-dioxynaphthalene-4-sulfonic acid.

In order to illustrate the new process more fully the following examples are given, the parts being by weight:

Example 1: 244.5 parts of 2-oxalylamino-4-chloro-5-amino-1-anisol ($C_6H_2$:$OCH_3$:$NH$.$CO$.$COOH$:$Cl$:$NH_2$=1:2:4:5)

are dissolved in 7000 parts of water containing 65 parts of sodium carbonate, 280 parts of hydrochloric acid of 19° Bé. are added and the mixture after being cooled to 10° C. is diazotized with 69 parts of sodium nitrite. The resulting diazo compound is introduced into a solution of 245 parts of 1-naphthylamin-6-sulfonate of sodium containing 250 parts of a 100 per cent. sodium acetate. The combination is complete after some minutes. After acidulation with hydrochloric acid the aminoazo compound is diazotized at 10° C. with 69 parts of sodium nitrite. The mixture is stirred for one hour and the diazo compound is then introduced into an aqueous solution cooled to 0° C. of 246 parts of 2-naphthol-7-sulfonate of sodium in water containing 550 parts of carbonate of sodium. The dye is precipitated with common salt and filtered off. It is then dissolved in 7000 parts of boiling water and the solution in order to eliminate the oxalyl group is heated to boiling for 10 minutes with 1500 parts of a 30 per cent. caustic soda lye, then cooled to 70° C., and the excess of NaOH neutralized with acid. The dye is filtered off and is then well mixed with 7000 parts of cold water, acidulated with 250 parts of hydrochloric acid and diazotized with 69 parts of sodium nitrite. The diazotation is complete after 4—5 hours' stirring and the diazo compound is then added to a cooled solution of 262 parts of the sodium salt of 1.8-dioxynaphthalene-4-sulfonic acid containing 300 parts of sodium acetate and a small quantity of acetic acid to render the solution slightly acid. It is stirred for half an hour and the mixture is then rendered weakly alkaline with carbonate of soda. The dye is filtered off and dried. It dyes cotton blue. The dye has most probably the formula:

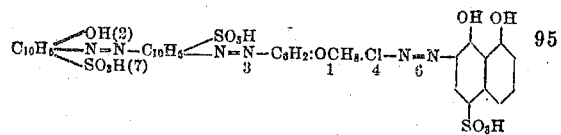

It is a dark powder soluble in water with a blue coloration, soluble in concentrated sulfuric acid with an olive coloration; yielding upon reduction with stannous chlorid and hydrochloric acid 2.5-diamino-4-chloro- 1-anisol, 1.4-naphthylenediamin-6-sulfonic acid, 1-amino-2-naphthol-7-sulfonic acid, 2-amino-1.8-dioxynaphthalene-4-sulfonic acid.

Example 2: 166 parts of nitro-para-xylidin:

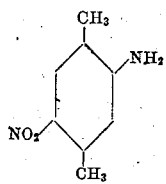

are dissolved in 2000 parts of water containing 170 parts of hydrochloric acid of 19° Bé. The solution is run into a mixture of 130 parts of hydrochloric acid and ice and is diazotized at from 5 to 10° C. The combination with 1-naphthylamin-6-sulfonic acid and then with 2-naphthol-7-sulfonic acid is carried out as described in Example 1. The disazo dye thus obtained is filtered off. It is then well mixed up with 7000 parts of water, the mixture is heated to 40–50° C. and reduced by means of 400 parts of crystallized sodium sulfid. After stirring for 2 hours, the dye is salted out, filtered off and washed with a solution of common salt. It is then made into a paste with 7000 parts of water, 300 parts of hydrochloric acid are added and the azo dye is diazotized with 69 parts of sodium nitrite. The further combination with the 1.8-dioxynaphthalene-4-sulfonic acid is carried out as it is described in Example 1. Other first components may be used e. g. monooxalyl-para-phenylenediamin, 2-oxalylamino-5-amino-para-xylol $(C_6H_2:CH_3:NH-CO.COOH:CH_3NH_2=1:2:4:5)$, 2-amino-5-acetylaminotoluene $(C_6H_3:CH_3:NH_2:NH-COCH_3=1:2:5)$, 2-oxalylamino-4-methyl-5-amino-1-anisol, 2-acetylamino-5-amino-1-4-dichlorobenzene; likewise other middle components e. g. 1-naphthylamin, 1-naphthylamin-7-sulfonic acid, meta-toluidin, xylidin, cresidin and other naphthol sulfonic acids e. g. 1.3-, 1.4-, 1.5-, 1.8-, 2.5-, 2.6-, 2.8-naphthol sulfonic acids or 1.3.6-, 1.3.7-, 1.3.8-, 1.4.7-, 1.4.8-, 1.5.7-, 2.3.6-, 2.4.8-, 2.5.7-, 2.6.8-naphthol-disulfonic acids, etc., may be used.

We claim:—

1. The herein described new azo dyestuffs having most probably the formula:

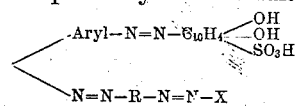

in which R means an aromatic nucleus and X the radical of an oxy-naphthalene sulfonic acid, which are after being dried and pulverized in the shape of their alkaline salts dark powders soluble in water; yielding upon reduction with stannous chlorid and hydrochloric acid 2-amino-1.8-dioxynaphthalene-4-sulfonic acid, a para-phenylenediamin compound, a diamin and an aminonaphthol sulfonic acid; dyeing cotton in from reddish-blue to greenish-blue shades which by an after treatment with diazotized para-nitranilin or other suitable diazo compounds are rendered fast to washing and which can be easily discharged with hydrosulfite to a pure white, substantially as described.

2. The herein described new azo dyestuff having most probably the formula:

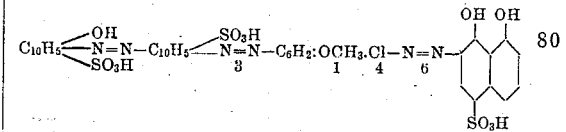

which is a dark powder soluble in water with a blue coloration and soluble in concentrated sulfuric acid with an olive coloration; yielding upon reduction with stannous chlorid and hydrochloric acid 2.5-diamino-4-chloro-1-anisol, 1.4-naphthylenediamin-6-sulfonic acid, 1-amino-2-naphthol-7-sulfonic acid and 2-amino-1.8-dioxynaphthalene-4-sulfonic acid; dyeing cotton in clear blue shades which by an after treatment with diazotized para-nitranilin are rendered fast to washing and which can be easily discharged with hydrosulfite to a pure white, substantially as described.

In testimony whereof we have hereunto set our hands in the presence of two subscribing witnesses.

HEINRICH JORDAN. [L. S.]
WILHELM NEELMEIER. [L. S.]

Witnesses:
  CHAS. J. WRIGHT,
  L. NUFER.

Copies of this patent may be obtained for five cents each, by addressing the "Commissioner of Patents, Washington, D. C."